March 10, 1942.　　　J. R. VOORHEES　　　2,276,126
SEED CORN GRADER
Filed Dec. 7, 1939　　　3 Sheets-Sheet 1

Fig.1.

Inventor
John R. Voorhees,
By G. C. Kennedy
Attorney.

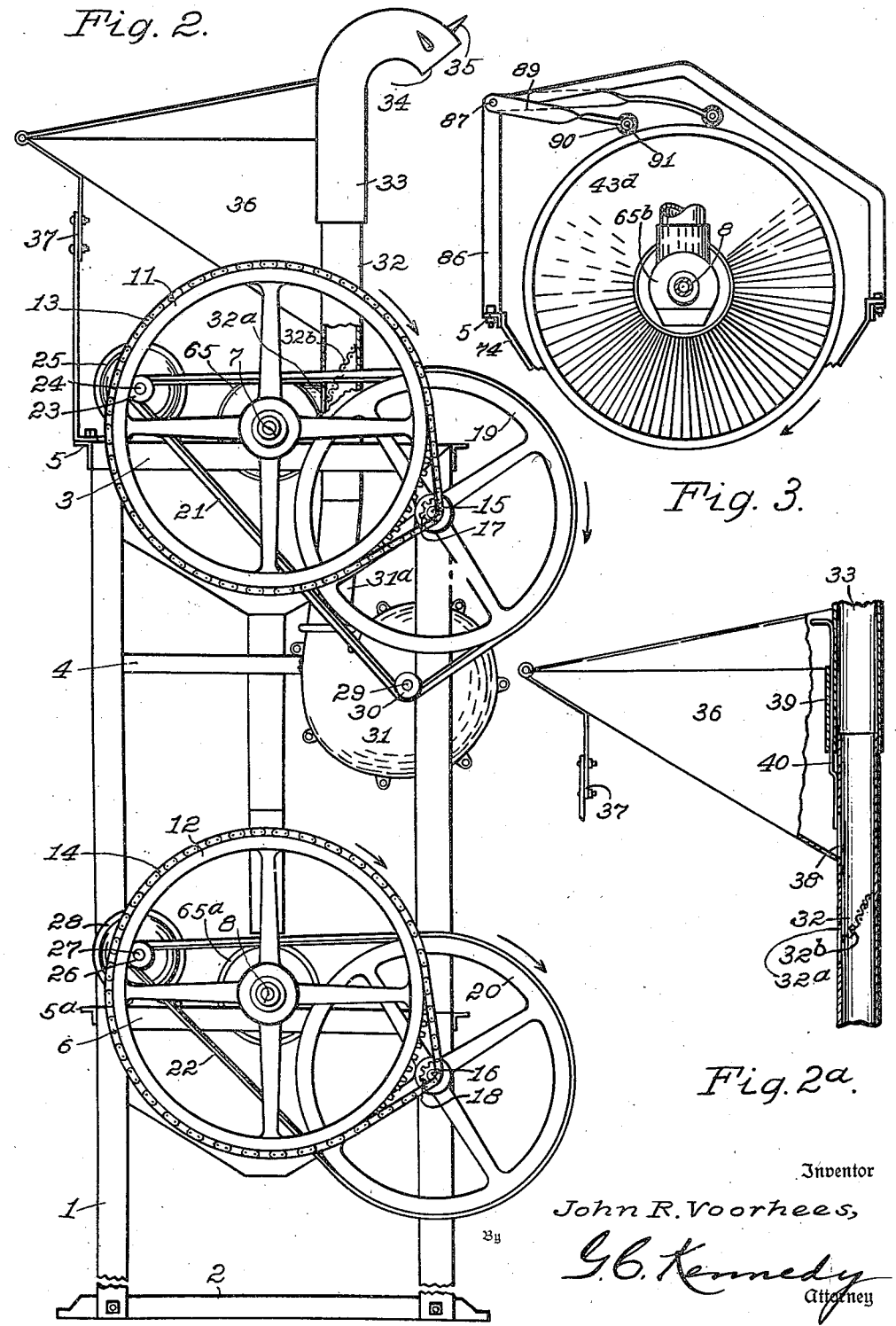

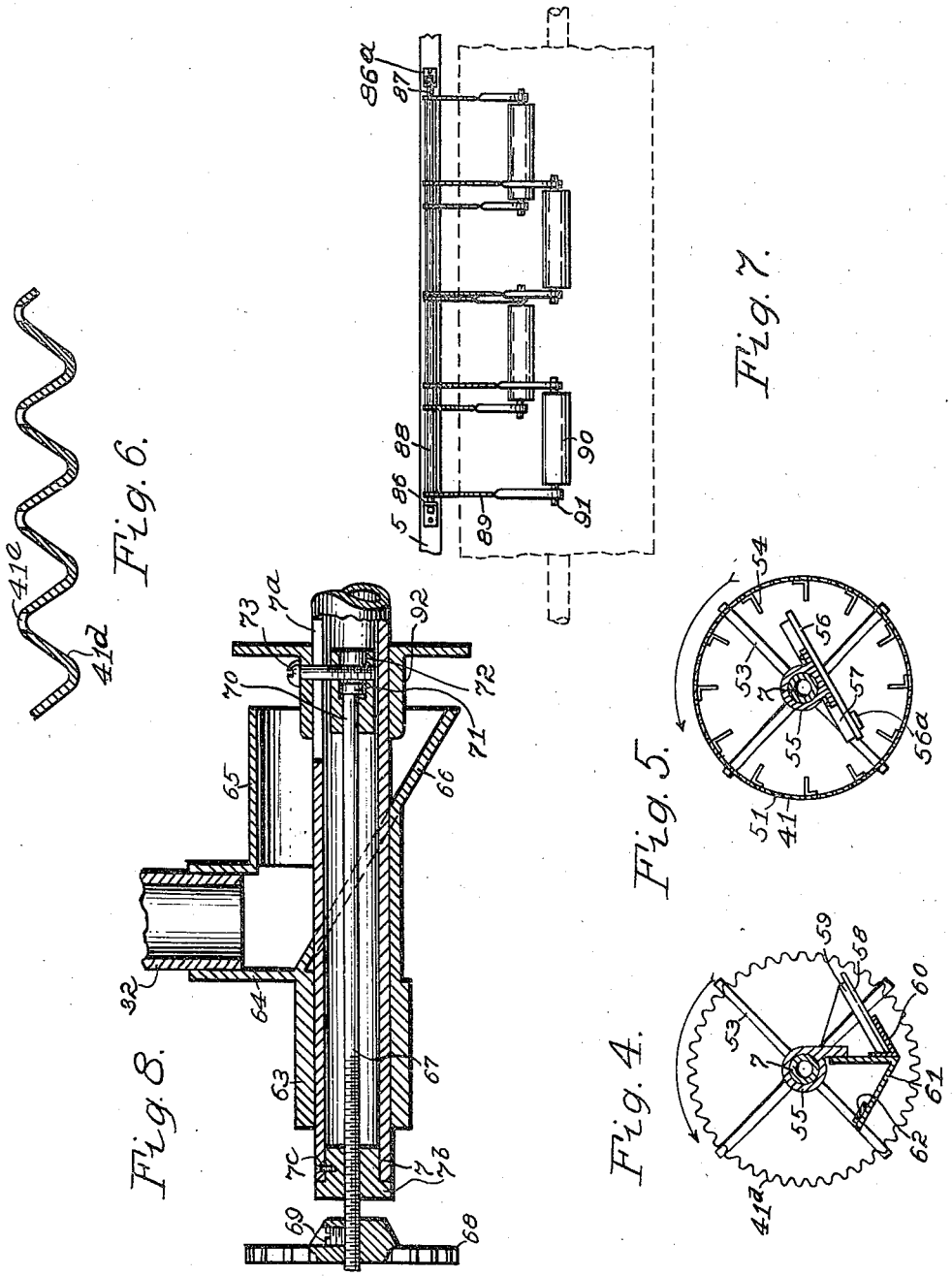

Patented Mar. 10, 1942

2,276,126

UNITED STATES PATENT OFFICE 2,276,126

SEED CORN GRADER

John R. Voorhees, Cedar Falls, Iowa

Application December 7, 1939, Serial No. 307,979

2 Claims. (Cl. 209—284)

My invention relates to improvements in seed corn graders or sorters, and particularly to associated rotary mechanical devices of this class. The principal feature of the improvements consists in the association of rotatable cylindrical sieves arranged horizontally longitudinally one above the other having communicating sections of which some have therearound pluralities of circular and other have pluralities of rectangular sieving apertures, and some of which have their apertures differently sized, for successively screening of the kernels according to widths and thickness, and in turn from the contents of corn kernels of varying shapes and sizes, particularly kernels segregated for separate delivery through such varying apertures, for the purpose of selecting different grades of kernels of choice uniform size for planting, and by discarding uneven inferior kernels.

Another important feature of the said improvements is the provision within the respective cylinder sections of loosely depending inclined plates each furnished with adjustably secured flanged propeller bars or members thereacross which may be varied in rearward slanting or inclinations as adjusted for propelling the kernels within the rotary cylinders at more or less speed rearwardly during the rotations of the cylinders, and also according to the varied shapes and sizes of the kernels, and for delivery in segregation separately and in succession.

Another improvement consists in the furnishing at the rear end of one cylinder an associated and smaller apertured auxiliary cylinder attachment rotatably connected therewith for additional screening purposes, and for separation of certain useless components of the mixture from certain types of kernels for separate delivery therefrom.

Another improvement is in mounting in the circularly apertured sections of the cylinders and in each one a longitudinal plurality of spaced propelling flanges, suitable for stirring the contents while lifting them as the cylinders rotate, and to deposit said kernels on the upper portion of the hanging inclined plates, thence sliding down the plates, moved toward the rearward end of the section by the slanting flanged propeller bars, and dropped again on the revolving section at a point beyond the lower center of the section, unobstructed by other kernels, to thereby expedite the sorting of the kernels to eject certain of them only through the apertures in the cylinder walls there provided for segregation of particular sizes or shapes of kernels to be delivered therethrough to receiving and separated discharge means.

Another improvement is in supplying independent sets of spouts adapted to separately deliver from a common hopper mixed corn kernels in succession to certain pluralities of the rotatable cylinders, in turn to thereby effectually separate kernels of different sizes and shapes during the progress of the same through the several sections of the cylinders.

Another improvement is in supplying means for adjustably varying the amount of delivery of the kernel mixture initially from the hopper and into the forward part of the upper cylinder, as may be necessary according to the condition of the mixture in differing particulars.

Another improvement is in the mounting of pluralities of suitable rollers to ride loosely upon certain of the cylinder sections and therealong, whereby the rollers act upon outwardly projecting kernels lodged in the cylinder screening orifices to push upon and return into the sections such lodged kernels to be then delivered to other sections having larger screening orifices.

Another improvement is in providing certain sections of the cylinders with longitudinally crimped walls, having pluralities of varying sized rectangular sieve openings on the outer surface, to turn the kernels of corn on their edges so that they may more readily enter the openings. Those kernels that do not drop through the openings remaining in the crimps, are carried up with the revolving section and dropped on the upper portions of hanging inclined plates, thence sliding down the plates, moved toward the rearward end of the cylinder by the slanting flanged propeller bars, and drop again on the revolving section at a point beyond the lower center of the section, unobstructed by other kernels.

Another improvement is the supplying of a blower or initially separating and discharging chaff, pieces of husks, cobs, cracked or split kernels, light weight imperfect kernels, and foreign substances from the mixture thereof with the kernels, at all times during the operation, and after delivery of the mixture, and the provision of means for varying the discharge of the hopper before said separation.

Another improvement is in supplying separate and individual motors for rotating said cylinders at desired speeds independently as found necessary during the respective sieving operations of the cylinders.

Another improvement is in the providing on the counterweight guide plates in the cylinder sections, of adjustable balancing devices thereon for maintaining the plates in equilibrium at the proper angle during operation as the cylinder rotates.

Another improvement is in supplying screening means placed inclinably in the air conduit between the hopper and the rotary fan device, to deflect the kernels of corn after being cleaned out of the conduit and into the spout leading into the cylinder, thereby preventing them from dropping down into the fan.

Another improvement is in supplying a housed fan-chamber for the above purpose, and which has an adjustably controllable slide for variably closing its air port, as may be necessary in the above segregations in mixture according to their natures.

All said mechanisms and means are associated in successive operations in effecting the conjoined purposes of my invention, and by the mechanisms and other means described herein and as displayed in the appended drawings, but it is to be understood that various changes or substitutions may be made in the apparatus without thereby departing from my invention and the protection of the appended claims.

Fig. 1 is a side elevation of my invention, with parts broken away or sectioned, or with portions or parts removed. Figs. 2, 2a and 3 are enlarged views of certain mechanisms. Fig. 2 is a forward elevation of my apparatus, with parts broken away. Fig. 2a is a front elevation of the hopper with parts broken away, and including the adjustable delivery closure therefor, and Fig. 3 is a forward end elevation of the frontal section of the main cylinders, including a front elevation of the rotary pair of rollers mounted on the frame swingable arms and loosely engaging the upper face of said section. Fig. 4 is a diagrammatic cross section, on the scale of Fig. 1, of one of the longitudinally ribbed sections of a cylinder. Fig. 5 is a diagrammatic cross section of one of the wall apertured cylindrical sections. Fig. 6 is an enlarged cross section of a portion of one of the longitudinally ribbed walls of a cylinder as developed upon a plane. Fig. 7 is a top plan of two pairs of said pressing rollers, with dotted lines locating the positions of cylinder sections below. Fig. 8 is an enlarged side elevation of the forward portion of the uppermost tubular longitudinal cylinder shaft of the invention, showing the association therewith of the first delivery device also in longitudinal section, with the means for adjustably varying the delivery from the hopper of said device into the forward upper cylinder, with parts of the shaft and the conduit supplying the delivery device, and of the adjusting hand-wheel broken away.

Referring to Figs. 1 and 2, I have provided a rigidly connected framework having longitudinally separated pairs of transversely spaced basal bars 2 and 2a having erected on their ends the vertical posts I and Ia respectively. The pair of posts I are connected across by vertically spaced bars 3, 4 and 6. The side posts are connected at their tops by longitudinal bars 5. Bearings 9 and 10 are mounted respectively medially upon the uppermost cross members of the frame and seat therein the horizontal upper shaft 7. Like bearings for the lower shaft 8 are likewise mounted below and in parallel with the upper shaft 7 on the cross members 6, as at 9a and 9b. The shafts 7 and 8 are prolonged forwardly beyond said bearings and forward posts and (see Fig. 2) carry the large gear wheels 11 and 12 respectively.

Pintles 15 and 16 are fixedly mounted, vertically spaced, upon one corner post 1, and carry rotatable pinions 17 and 18 respectively. Like chain belts 13 and 14 are reeved about the pairs of wheels 11 and 12, and the pairs of pinions 17 and 18 respectively. Belt-wheels 19 and 20 have inward V-shaped rims seating therein the belts 21 and 22, whose inner tread in each case is shaped in V-shape to fit the said wheels, with the farther parts of their treads seated in the treads of small wheels 23 and 26 of like troughed rims.

A pair of rotary motors 25 and 28 are fixed on the cross-bars 3 and 6 respectively, with their protruding shafts 24 and 27 carrying the wheels 23 and 26. An incased blower fan at 31 has its pintle 29 carrying a small V-shaped rim 30 which seats therein the belt 21. It will be seen that by such means the upper motor 25 rotates both the upper shaft 7 and also the fan-shaft 29.

The relative arrangements of the lower pair of large wheels 12 and 20 is the same as that of the upper pair of wheels 11 and 12, the larger wheel 11 carrying the chain-belt 14, which engages the pinion 18, while the wheel 20 likewise carries a V-shaped belt 22 driven by another motor 28 with its drive-shaft 27 and grooved pinion 26, but without a fan drive. The larger wheel 12 is mounted on the lower shaft 8, and the pinion 18 is mounted on the fixed shaft 16 supported on a frame post 1.

Referring to said Figs. 1 and 2, Fig. 1 shows at 31b an imperforate slide mounted in slideways on the fan casing 31, for adjustably varying the amount of air entering the casing. The delivery spout 31a (Figs. 1, 2 and 2a) extends upwardly into communication with the lower end of a vertical pipe 32, which in turn communicates with the lower end of an erect delivery section 33 whose upper end is curved to one side to deliver downwardly, and has a plurality of spurs 35 on and near its delivery end for hanging the open ends of sacks thereon removably, to receive dirt or other waste substances blown out by said fan device.

An inclined wire netting 32b divides the interior of the pipe section 32, permitting the escape of such waste detritus while baffling the escape of corn kernels through the netting, but deflecting the cleansed kernels into the neck connection member 65—66, which in turn directs them into the upper cylinder section 41 through its drumhead 43d. The lower part 66 is widened downwardly as shown in Figs. 1 and 8.

The cylinders are internally connected by radial spokes 53 with hubs secured upon the shafts 7 and 8. The centrally open conical heads 43d of the upper cylinder and of the lower pair of cylinders, embrace or inclose the flaring end parts 66, also 65a and 65b, respectively.

In Fig. 1, the neck connection sleeve 64 seats therethrough the conduit 32, the latter having an opening or port 32a as shown in Figs. 2 and 8, beneath the sloping netting 32b. Referring to Fig. 8, on a larger scale, the neck connection therein shown is similar to that of Fig. 1, with one exception. As shown in Fig. 8, the forward end part of the hollow shaft 63 is stopped by a closure plug 7b secured by a set-screw 7c. This plug is centrally apertured and traversed by a shaft 67, having on its outer end a hand-wheel 68 secured thereon by a set-screw 69. The interior bore of the plug 7b is threaded to receive the thread on the shaft 67 forwardly, and the rear end part of the shaft is enlarged at 71 to loosely fit a hollow 7a in a block in the bore of the shaft 7, with a threaded screw pin 73 traversing said block as also a longitudinal slot 7a in the shaft 7. The screw 73 is also removable, but traverses a sleeve 92 on the shaft 7. The slot 7a in the shaft 7 permits the baffle member flange of the sleeve 90 to be adjusted for a limited distance along the shaft 7, in more or less contracting the open delivery end of the neck delivery part 65 (or 65a), according to the condition of the kernels treated and the amount of discharge rate necessary therefor under different conditions of handling. Bearing sleeves 55 on opposite sides of the hubs of the spokes 53 are loosely seated on the shafts 7 and 8, and are fastened on like faces at both ends of the rectangular plates 56 thus hung on said shafts in the cylinder sections both above and below.

The plates 57 in the peripherally apertured sections 41, 41a, 41b, 41c and 42 are larger than the like plates 58 in the longitudinally ribbed sections 41d, 42a, 43 and 43b. All of these plates have on like unidirectional faces at one side a plurality of flanged members 57, pivotally hung on the plates at their tops on pintles 59, and inclined as shown, similarly. Pins 56b traverse the lower ends of the members 57 and 59, insertably removable in pluralities of socket holes 57a in the plates 56, the holes being arranged arcuately in line to properly seat in any hole thereof, to thus vary the rearward inclinations as desired of the said members 57, whereby the corn kernels in the sections of the cylinders are picked up and then slidably directed rearwardly along the sections. One or more of the members 57 may be separately more or less inclined on a plate 56 rearwardly, adjustably, to vary the speed of descent on each member rearwardly, and whereby the forward member or members in each cylinder may more rapidly clear the kernels in descending to prevent an accumulation in the forward divisions of the cylinders. In the rear cylinders, because of the preliminary clearance of the forward cylinders, the members 57 may be gradually less inclined. The plates all hang loosely and are counterbalanced by adjustable weights 62 and 56a respectively crossing the under faces of the plates. The kernels are thus lifted and also longitudinally transferred along the sections. The moving kernels thus individually select and pass through holes of differing diameters of the sections while in movement.

The small holes 51 in the two forward sections 41 and 41a of the upper cylinder will pass the smallest kernels, while the larger holes 52 in the pair of sections 41b and 41c pass somewhat larger kernels. The ribbed rear section 41d has larger rectangular holes 41e along the outer angles of the ribs as shown in Fig. 6, for taking out the thicker grade of flat kernels for "edge drop" planting.

A smaller auxiliary open ended cylinder 47 has an arm 44b extending radially to and fixed terminally on a stub rotary shaft 46 mounted for rotation on a rear cross bar of the frame and carrying a sprocket-wheel, and a sprocket-chain 48 is reeved about this wheel and another like wheel above at 49 on the rear end of the shaft 7. The cylinder 47 has a plurality of holes 44 therearound for passing therethrough grade No. 3 kernels which drop into and through a depending funnel 45 to a receptacle not shown. The largest thick round kernels are delivered from the cylinder 47 at its rear end across a short lip 45b. Four flanged bars 51, spaced evenly apart are mounted along the inner wall of the cylinder 47, and so inclined longitudinally as to serve to lift, agitate and propel the said grades of kernels along the inner wall of the cylinder for delivery therefrom as stated.

The smaller like plates 58 in all of the ribbed sections 41d, 42a, 43 and 43b have, as shown in Figs. 1 and 4, flanged bars 59 thereacross similar to those shown on the larger plates 56, and mounted on the plates adjustably likewise. On a hanger 61 (Fig. 4) on each side of the same face of each plate 58 a cross-bar weight 62 is end-secured to keep the plate in one position during the rotation of the cylinder in which this type of plate is located. The lower ribbed section 42a has small apertures 41f to pass therethrough small kernels. The lower ribbed sections 43 and 43b have apertures of the same size and shape, longer than the apertures in the section 42a and of less size than the apertures in the ribbed section 41d, and will pass through their apertures kernels of intermediate size between the sections 42a and 41d, for large flat shapes.

The upper and lower cylinders all have flatly conical centrally apertured forward heads, such as 43d. The angular delivery devices 65, 65a and 65b are all substantially of the same shape with upper tubular sleeves 64, cylindric bearings 63, and rearwardly flaring spouts 66. Fig. 8 shows on an enlarged scale this type of delivery devices. The other elements shown in Fig. 8 are employed only in a rotary grader not equipped with fan cleaner, and for adjusting variably the amount of delivery of kernels therethrough. As shown in the cylindrical cylinder sections, but not in the ribbed sections, and illustrated also in Fig. 5, evenly spaced interior angle-bars longitudinally disposed at 54 are secured to the inner faces thereof around the inner wall of each such section, and function when the section 51 is rotated in the direction of the arrow, to pick up and propel portions of the kernels around the interior of the section to be gradually delivered downwardly across the upper face of the plate 56 to slide downwardly across the plate as slopingly adjustably guided by the plurality of angle-bars 57, thus imparting a movement of the kernals longitudinally rearwardly through the section.

It will be understood that the necking bodies 65a deliver the mixed kernels into single or a plurality of communicating sections at their lower parts, to be thence carried below the plate in each case and upwardly, and in this transit a proportion of the mixture of kernels pass into and through the wall openings of the sections, whence they are delivered into hoppers 75, 77, 79 and 81 supported below the sections, these hoppers being parts of an open top inclosure 74 end-supported on the bearings 65a and 65b of tubes 76—78, 79—81, and in the rear upon a part 9b of the machine frame. The rearmost ribbed section 41d is above and delivers into a hopper 83 with depending spout 84. The spout 84, also the spout 45 of the small cylinder are both inclined to the same side of the machine. The hoppers 75 and 77 supply the lower sections 42 and 42a, while the hoppers 79 and 81 supply the sections 43 and 43b. Like hoppers are supported beneath all of the lowermost sections, being hung in front and medially between the spaced pairs of sections on the angled spouts 65a and 65b, at the rear supported in the frame bearing 9a.

Referring again to Figs. 2 and 2a, Fig. 2a and also Fig. 2 show a sectional bar support or prop 37 whose lower member is fixed on the machine frame and whose upper member is connected separably to the lower end of the upper member and secured at the top to the under sloping face of the hopper 36. Fig. 2a shows that said hopper is secured on the pipe sections 32 and 33, with a part of one side wall broken away. The bottom plate of the hopper slopes downwardly to the pipe section 32 and by an aperture 38 in this section the kernel contents of the hopper are delivered into this section above and upon a sloping wire setting 32b whose lower end crosses an aperture 32a in the pipe section 32 and enters into the angle-member delivery part 64 and 65—66 whence the kernals are ejected into the first upper cylinder section 41. As shown in said Fig. 2, air from the fan-wheel in the casing 31 is forced upwardly through the netting 32b and issues from the downwardly curved member 33 at its delivery end 34. As the lower end of the netting 32b crosses the aperture 32a medially, kernels of the hopper 36 pass downwardly through the vent 38, which is controlled by a slide-member 40 (Fig. 2a) in a sleeve 39, and which may be manually adjusted to vary the discharge of the hopper 36. Any dirt or light dross such as chaff among the kernels delivered is driven out of the pipe member 33 by way of the netting, which latter stops the issue of the kernels therethrough, the kernels passing downwardly and sidewise into the member 65 about the lower end of the netting for delivery thence to the cylinder section 41, as the aperture 32 is medially divided by the netting.

Referring now to Figs. 1, 3 and 7, I have adopted and successfully used means shown in said figures for pressing upon and returning inwardly any kernels which may stick in and protrude outwardly from wall apertures of the respective cylinder sections. Fig. 7 shows spaced standards 86 and 86a whose lower ends are secured rigidly upon the upper edge part at one side and upon a flange of the member 5 (Fig. 3) and as shown in Fig. 7 one or more pairs of arms the pairs having arms 89 pivoted thereon swingably on a connecting rod 87 end-secured to the tops of the standards, the outer free ends of the pairs of arms connected by a pintle 91 for free rolling of a rubber roll 90 thereon, which is supported along the top part of each ribbed section of a cylinder, and (Fig. 7) the opposite ends of the arms are pivoted on sleeves 88 between the members of each pair of arms, and between abutting ends of arms of pairs. Fig. 3 shows an end elevation of the framing support of one pair of such rolls and of the arms 89 end-pivoted at 87, with the rolls freely riding upon a cylinder. The rolls are preferably set off from each other in pairs transversely relative to the cylinder sections, and the rolls may be composed of other substances than rubber if desired.

I claim:

1. In a rotary corn grader, in combination, a supporting frame, a longitudinal horizontal rotatable shaft end-mounted on said frame, a like longitudinal horizontal rotatable shaft end-mounted on the frame below the first shaft, alined connected cylinder sections rigidly mounted on the first shaft, the rearmost section being longitudinally corrugated with relatively large perforations in and along the corrugations, the sections in advance of the corrugated section being cylindrical and numerously perforated, weighted plates loosely suspended in the several sections and having transverse adjustable rearwardly inclined spaced flanges on their upper faces, said advance sections having in each like circumferentially spaced inwardly directed longitudinal flanges on their inner walls, said advance sections being in pairs, in which the forward pair have like perforations of minimum size, the succeeding pair having like perforations but of larger size, a single smaller cylindric section rotatably mounted on the rear frame, numerously perforated and having on its inner wall spaced longitudinally tilted and inwardly directed flanges, a hopper with depending neck positioned beneath the latter cylinder supported on the frame, driving connections between the upper shaft and the latter cylinder, said second shaft having fixed thereon spaced pairs of cylinders, the forward pair composed of a front section numerously minutely perforated, supplied with inner wall spaced longitudinal flanges, also supplied with a suspended weighted and flanged plate such as those in the forward sections of the upper cylinder, the rear section of the forward pair on the lower shaft being longitudinally corrugated with relatively small perforations along the corrugations, the rear cylinder on the lower shaft being spaced from said front section and the sections of said rear cylinder being of like construction as the rear section of the forward pair on the same shaft but with larger perforations and with like plates and flanges, conjoint conduits for receiving sieved kernels from the forward pair of sections on the upper shaft and delivering them into the first section of the first pair on the lower shaft, like conjoint conduits for receiving sieved kernels from the second pair of sections on the upper shaft and delivering them into the first section of the rear pair of sections on the lower shaft, like mechanisms for separately rotating the shafts in the same direction, a hopper in adjustable communication with the forward section of the upper cylinder, pairs of longitudinally alined rollers loosely supported to ride longitudinally upon the upper parts of said corrugated sections to push back clogged kernels in their perforations, and like separate power driven mechanisms associated with and connected to said shafts respectively, for rotating them in the same direction.

2. In a rotary corn grader, in combination, a rotatable longitudinally side-apertured hollow shaft, an open end cylinder with apertured wall traversed by the shaft and having a flaring open end, a nut secured in the open end of the shaft, a threaded inner shaft traversing the nut from without with a hand-wheel fixed on its outer end, a slide-block in the shaft with an end of the shaft rotatably engagingly seated therein, an apertured hub member mounted limitedly slidably on the shaft about the side-aperture therein, and releasable securing means traversing said hub at the side-aperture of the shaft and said hub member, for adjustments of the hub member along the shaft, to shift said member to and from the flaring end of the cylinder to vary the scope of delivery thereof.

JOHN R. VOORHEES.